(12) United States Patent
Howard

(10) Patent No.: US 6,680,686 B1
(45) Date of Patent: Jan. 20, 2004

(54) REMOTE IONIZING RADIATION DETECTOR

(75) Inventor: Robert J. Howard, Clifton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/213,627

(22) Filed: Aug. 6, 2002

(51) Int. Cl.⁷ .................. G01S 13/04; G01S 13/88; G01T 1/16; G01T 1/29
(52) U.S. Cl. .................. 342/27; 342/118; 342/134; 342/195; 376/245; 376/250; 376/259
(58) Field of Search .................. 342/22, 27, 28, 342/175, 195, 59, 118, 134–147; 376/245, 249, 250–255, 259

(56) References Cited

U.S. PATENT DOCUMENTS

| 4,630,051 A | 12/1986 | Adams et al. |
| 4,717,916 A | 1/1988 | Adams et al. |
| 4,837,503 A | 6/1989 | Hasenzahl |
| 5,608,328 A | 3/1997 | Sanderson |
| 6,008,496 A | 12/1999 | Winefordner et al. |

FOREIGN PATENT DOCUMENTS

| WO | WO-95-14940 A1 * | 6/1995 | .......... G01S/13/95 |
| WO | WO-99-13409 A1 * | 3/1999 | .......... G06F/17/15 |

* cited by examiner

*Primary Examiner*—Bernarr E. Gregory
(74) *Attorney, Agent, or Firm*—Simpson & Simpson, PLLC

(57) ABSTRACT

A method and apparatus for the detection of radioactive material in an area is disclosed. The apparatus comprises a transmitter operatively arranged to transmit electromagnetic radiation, a receiver operatively arranged to measure an intensity of the electromagnetic radiation, and processing means operatively arranged to determine the presence of radioactive material based on the intensity measurement. Two receiver configurations are possible. In the first, the receiver measures the intensity of the electromagnetic radiation reflected by ion tracks in the air proximate to the area scanned for radioactive material. Alternatively, the receiver measures the intensity of the electromagnetic radiation transmitted by the air proximate to the area scanned for radioactive material.

22 Claims, 6 Drawing Sheets

REMOTE IONIZING RADIATION DETECTOR

FIELD OF THE INVENTION

This invention relates to the detection of radioactive materials. More specifically it relates to a method and apparatus for the detection of radioactive materials using electromagnetic radiation. Even more specifically, the present invention relates to a method and apparatus for the detection of radioactive material by detecting the reflection of electromagnetic radiation from ion tracks created by alpha, beta, and gamma radiation.

BACKGROUND OF THE INVENTION

It is well known that emissions from radioactive materials, alpha and beta particles and gamma rays, are extremely dangerous to both plants and animals. Various means to detect the presence of radioactive materials have been developed. One of the most common and well-known radiation measuring apparatuses is the Geiger counter. The Geiger counter detects the ionization that occurs in the atmosphere due to the presence of alpha and beta particles and gamma rays. A Geiger counter typically comprises a tube enclosing a cylinder cathode surrounding a rod-like anode. The cathode and anode are connected through an end wall of the tube to a source of electrical voltage. The tube is filled with a gas, usually a mixture of an inert gas, such as argon or neon, and a halogen, such as chlorine or bromine, at a low pressure, e.g., a few centimeters of mercury. A high voltage, e.g. 550 volts, is set up between the cylinder and the anode. This voltage is just a little less than that needed to create an electrical discharge between the two electrodes.

When a charged particle of sufficient energy enters the tube, it knocks electrons out of the atoms of the gas. These electrons, being negatively charged, are attracted towards the anode, and the atoms from which the electrons originated (which become positively charged ions) are attracted by the cathode. The high voltage established between the anode and cathode creates a high voltage gradient that accelerates the liberated electrons sufficiently to knock further electrons out of atoms, which in turn are accelerated by the high voltage gradient to knock still further electrons out of other atoms, creating an "avalanche" of electrons. As the avalanche of electrons continues, the positive ions are also accelerated towards the cathode wall. These positive ions strike the cathode wall with sufficient energy to release still additional electrons. All of these electrons descend on the anode wire and are detected as a pulse of electric current. The occurrence of this pulse thus indicates that a charged particle has passed through the tube. The electrical pulses can then be amplified and counted, using appropriate electronic counting circuitry, and/or converted to audible sound, to provide a user of the Geiger counter a quantitative and/or qualitative measure of the number of charged particles encountered by the Geiger counter.

An underlying problem with Geiger counters, and other radiation detecting apparatuses, is that they must be within the vicinity of the radioactive material to detect it. This means that they need to be carried to the area to be evaluated, exposing human personnel to the radiation. Even if carried by a remotely operated vehicle, the vehicle may be exposed to radioactive material and need to be cleaned before human personnel can safely come in contact with it.

Clearly, then, there is a longfelt need for a radioactive material detection apparatus that can detect the presence of radioactive materials from a distance, to prevent potential exposure of the apparatus and the user to radioactive material.

SUMMARY OF THE INVENTION

The present invention broadly comprises a method and apparatus for the detection of radioactive material in an area. The apparatus comprises a transmitter operatively arranged to transmit electromagnetic radiation, a receiver operatively arranged to measure an intensity of the electromagnetic radiation, and processing means operatively arranged to determine the presence of radioactive material based on the intensity measurement.

A general object of the present invention is to provide a method and apparatus to remotely detect radioactive material.

Another object of the present invention is to provide a method and apparatus to detect ion tracks in the atmosphere.

These and other objects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE PREFERRED EMBODIMENT

It should be appreciated that, in the detailed description of the invention which follows, like reference numbers on different drawing views are intended to identify identical structural elements of the invention in the respective views.

As is known in the art, alpha, beta, and gamma radiation ionize molecules in the air as they traverse the air, creating tracks of ionized molecules. Alpha particles produce ion tracks that are approximately 1–10 cm. Gamma rays do not directly ionize air molecules. Instead gamma particles produce beta particles that ionize the surrounding air. Thus, both gamma and beta radiation will produce similar ion tracks, which are relatively longer, on the order of 10–100 cm. Ion tracks created by either alpha or beta particles last approximately 1 ms.

Figure 1:
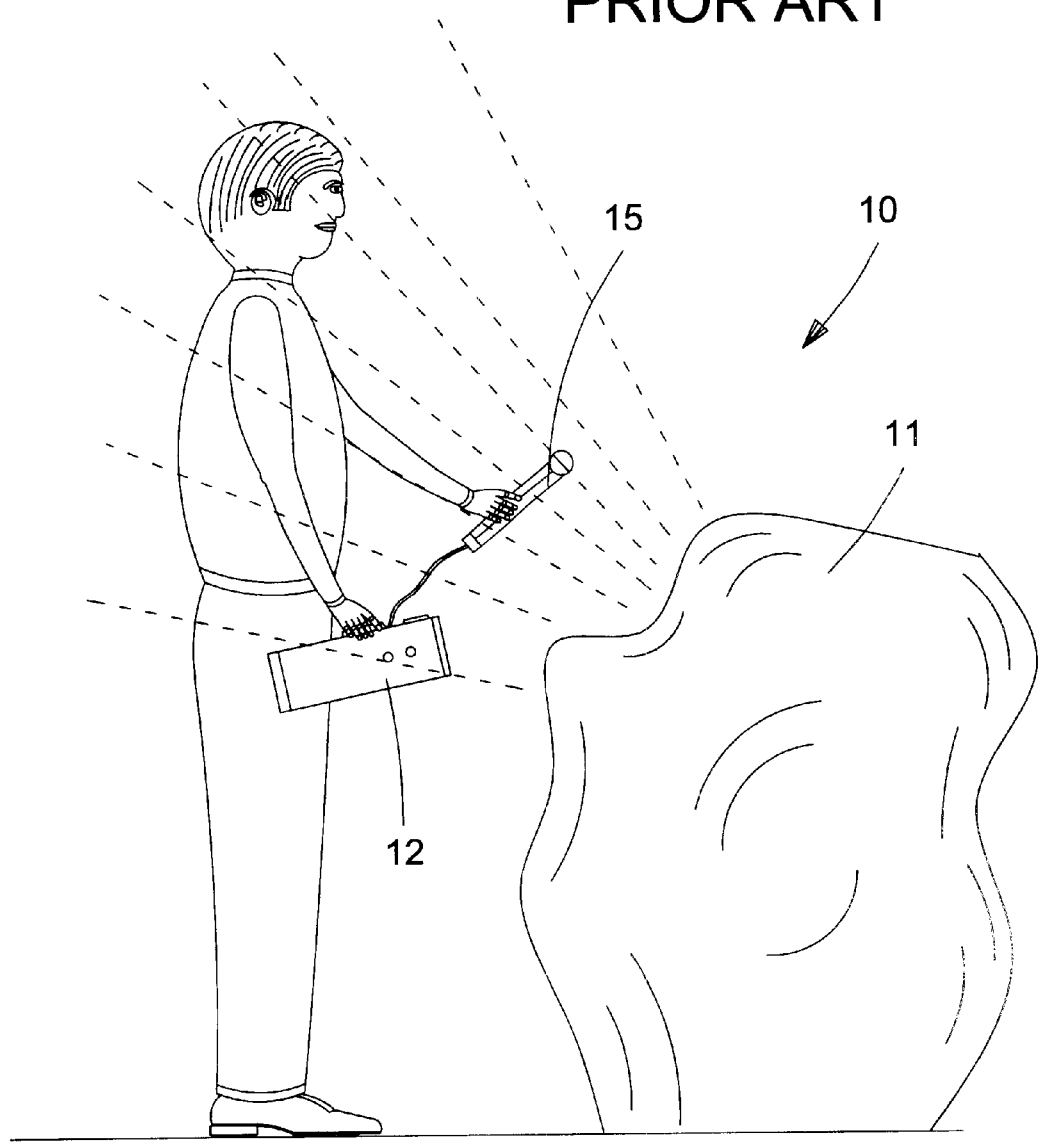
FIG. 1 is a view of a Geiger counter being used to test a substance for radioactive material.

FIG. 1 shows a person using Geiger counter 10 to determine if object 11 is emitting radiation. As discussed above, tube 15 detects ion tracks created in the presence of radioactive material. Unit 12 provides electrical power to the tube for maintaining a voltage between the anode and the cathode. As described above, the user must be proximate the object 11 to determine if it contains radioactive material, which exposes the user to the potential radiation hazard.

Figure 2:
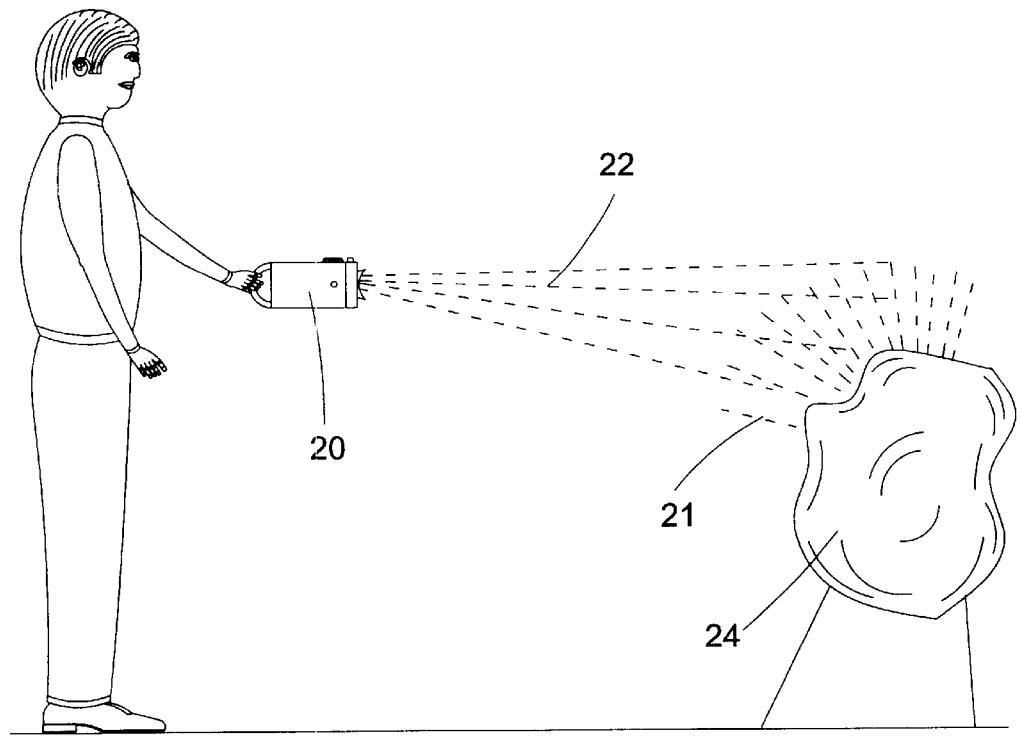
FIG. 2 is a view of an embodiment of the present invention testing an object emitting alpha radiation.

FIG. 2 shows a person using an embodiment of the present invention to determine if object 24 contains radioactive material emitting alpha particles. Apparatus 20 emits radio frequency waves 22 in the direction of object 24. If object 24 contains radioactive material emitting alpha particles, then relatively short ion tracks 21 will be created in the air surrounding object 24. If the wavelength of waves 22 is comparable to the length of tracks 21, then tracks 21 will act as antennae in a similar manner to chaff. By emitting waves 22 at frequencies in the range of approximately 3 to 30 GHz, waves 22 will be reflected by tracks 21. By detecting the level of the reflected radiation, the amount of ionization in the air can be determined, and the presence of radioactive material emitting alpha particles in object 24 can be confirmed.

Figure 3:
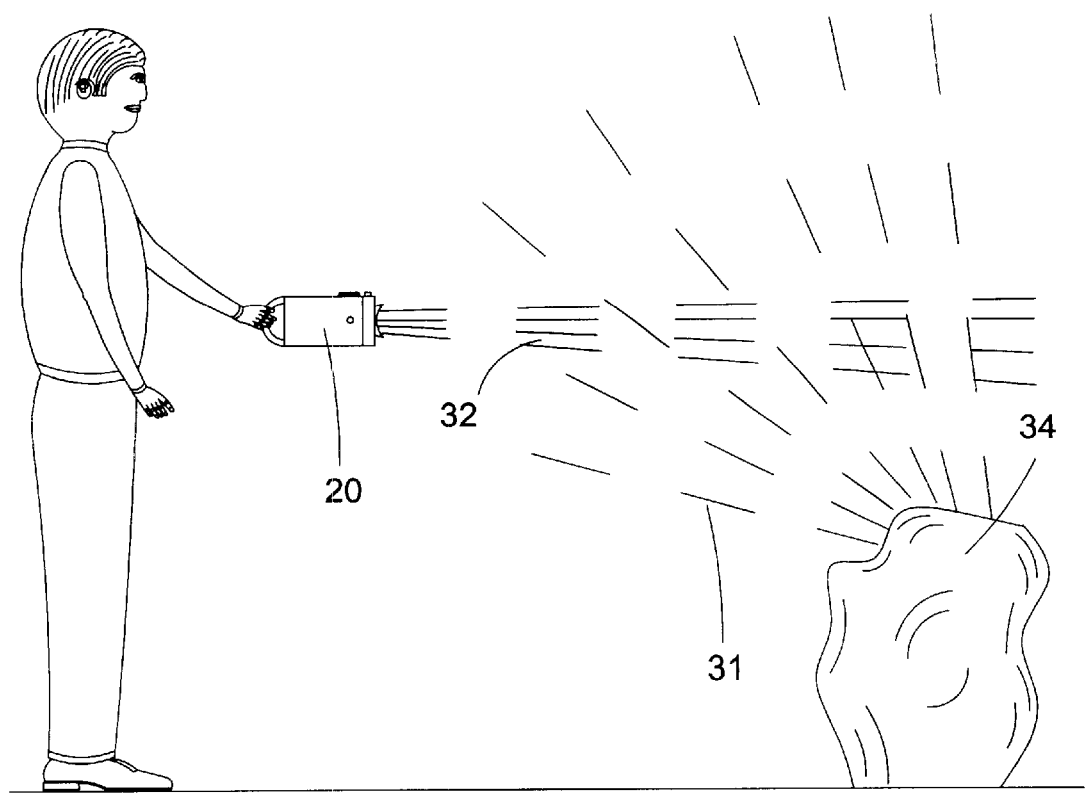
FIG. 3 is a view of an embodiment of the present invention testing an object emitting beta and/or gamma radiation.

FIG. 3 depicts longer tracks 31 being created in the atmosphere proximate object 34, such as those created by the presence of beta particles in the atmosphere. Apparatus 20 emits radio frequency waves 32 to determine the presence of radioactive materials in object 34. Emitting radio frequency radiation having a frequency of approximately 300 MHz to 3 GHz enables apparatus 20 to detect beta and gamma radiation. In a preferred embodiment, the frequency is varied within the range of 300 MHz to 30 GHz to determine if any alpha, beta, or gamma particles are being emitted by an object being tested. However, it should be readily apparent to one skilled in the art that radio waves having frequencies outside the range of 300 MHz to 30 GHz can be used to detect ion tracks, and these modifications are within the spirit and scope of the invention as claimed.

As stated above, the ion tracks last on the order of 1 ms. To separate the return from different tracks, a preferred embodiment of the present invention maintains a spacing of 1 ms between each transmitted pulse. In a preferred embodiment, the pulse length is 10% of the range of the object being tested. Thus, testing objects at 3000 m would result in a pulse length of 1 μm. Including a 1 ms pause between pulses results in a pulse rate frequency of 1/(0.001001 seconds) or 999 Hz. Since the distance at which objects are to be tested ranges from 10 m to 10 km, pulse lengths range from 33 ns to 33 μs. Thus pulse repetition frequencies range from approximately 968 Hz to 1 kHz, in a preferred embodiment. However, it should be readily apparent to one skilled in the art that other pulse lengths and rates could be used to detect ion trails, and these modifications are within the spirit and scope of the invention as claimed.

Figure 4:
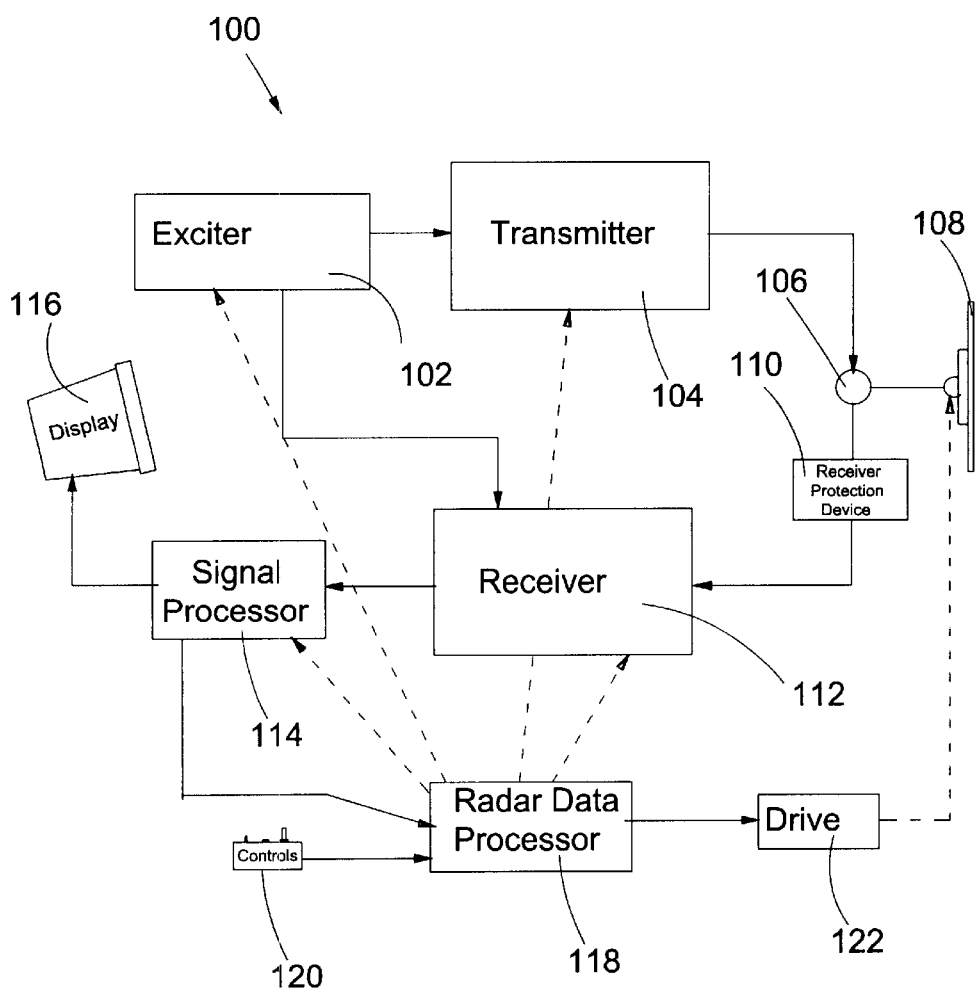
FIG. 4 is a schematic of a typical embodiment of the present invention.

FIG. 4 shows a schematic of a typical pulse-doppler radar system 100 that can be used to practice the present invention. Apparatus 100 comprises planar array antenna 108, which is operatively arranged to both send and receive radio frequency radiation. Exciter 102 produces a signal at the desired transmission frequency and phase for the transmitter, and a reference signal used by the receiver. Transmitter 104 amplifies the signal it receives from the exciter to generate radio frequency pulses. Transmitter 104 is typically a traveling wave tube, well known in the art. Duplexer 106 allows transmission waves to travel from the transmitter to the antenna and received waves to travel from the antenna to the receiver protection device 110, but attenuates all other signals. Antenna 108 directs the radio frequency wave in a desired direction and receives electromagnetic radiation from that direction. Radio frequency waves incident on antenna 108 pass through receiver protection device 110 to receiver 112 as long as the waves have a power level below a predetermined threshold. Device 110 attenuates signals above the predetermined threshold to prevent receiver 112 from being exposed to signals that would damage the receiver circuits. The receiver mixes the return with the reference signal from the exciter to produce video frequency signals. The video signals are sent to signal processor 114. Signal processor 114 analyzes the video signals and determines if any targets have been detected. The targets are shown on display 116. A user viewing the display can determine, based on the returns displayed, if there is any radioactive material in the object being tested. Controls 120 send commands to the antenna. These commands can be user generated or a predetermined search pattern. Radar data processor 118 modifies these commands if the radar system is moving relative to the ground. The modified commands are sent to drive 122 that adjusts the orientation of the antenna. It should be readily apparent to one skilled in the art that other components known in the art can be used to implement the present invention, and these modifications are within the spirit and scope of the invention as claimed. It should also be readily apparent to one skilled in the art that the present apparatus can activate an audible and/or visible alarm when a predetermined level of return is received, rather than requiring a user to watch a display to determine the presence of radioactive material. These modifications are also within the spirit and scope of the invention as claimed.

Figure 5:
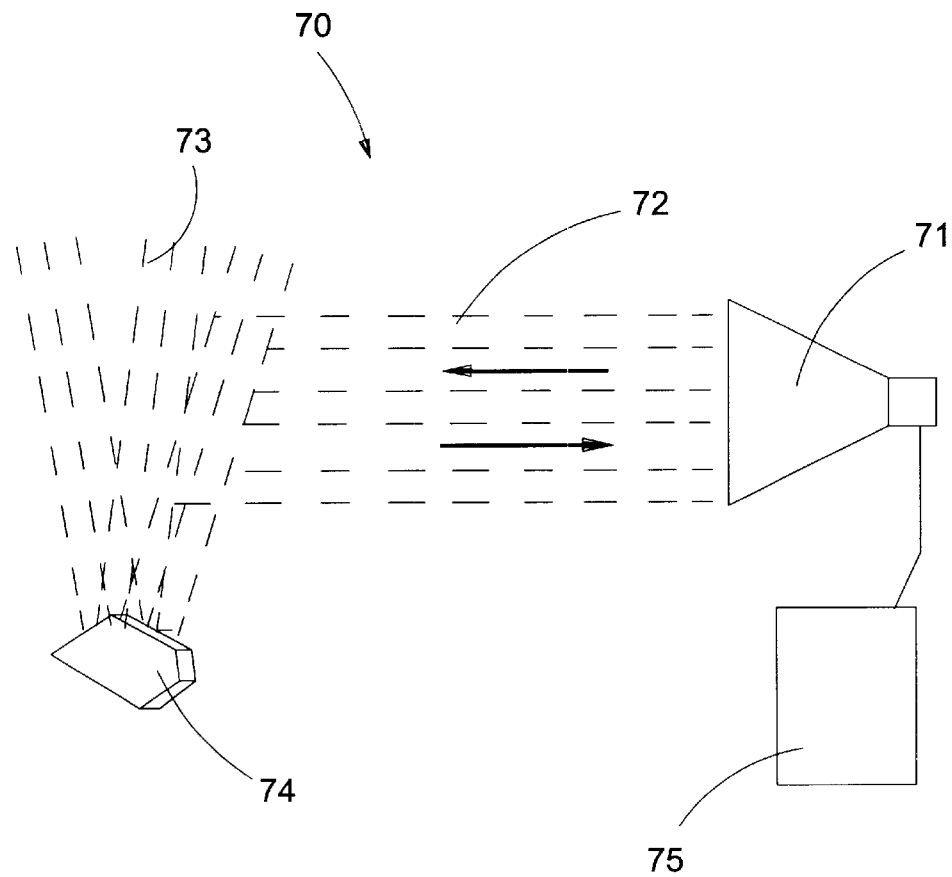
FIG. 5 is a schematic of an embodiment of the present invention that measures the amount of radio frequency radiation reflected by ionization trails.

FIG. 5 shows an embodiment of the present invention 70 comprising radio frequency antenna 71. The antenna shown in FIG. 4 is operatively arranged to both send and receive radio frequency radiation 72, as shown by the arrows. The radiation 72 is reflected by ion tracks 73 created by radioactive particles emitted by object 74. Unit 75 comprises the rest of the apparatus, an example being shown in FIG. 4. Apparatus 70 determines the level of radio frequency radiation reflected by ion tracks 73, and determines the presence of radioactive material from this measurement.

Figure 6:
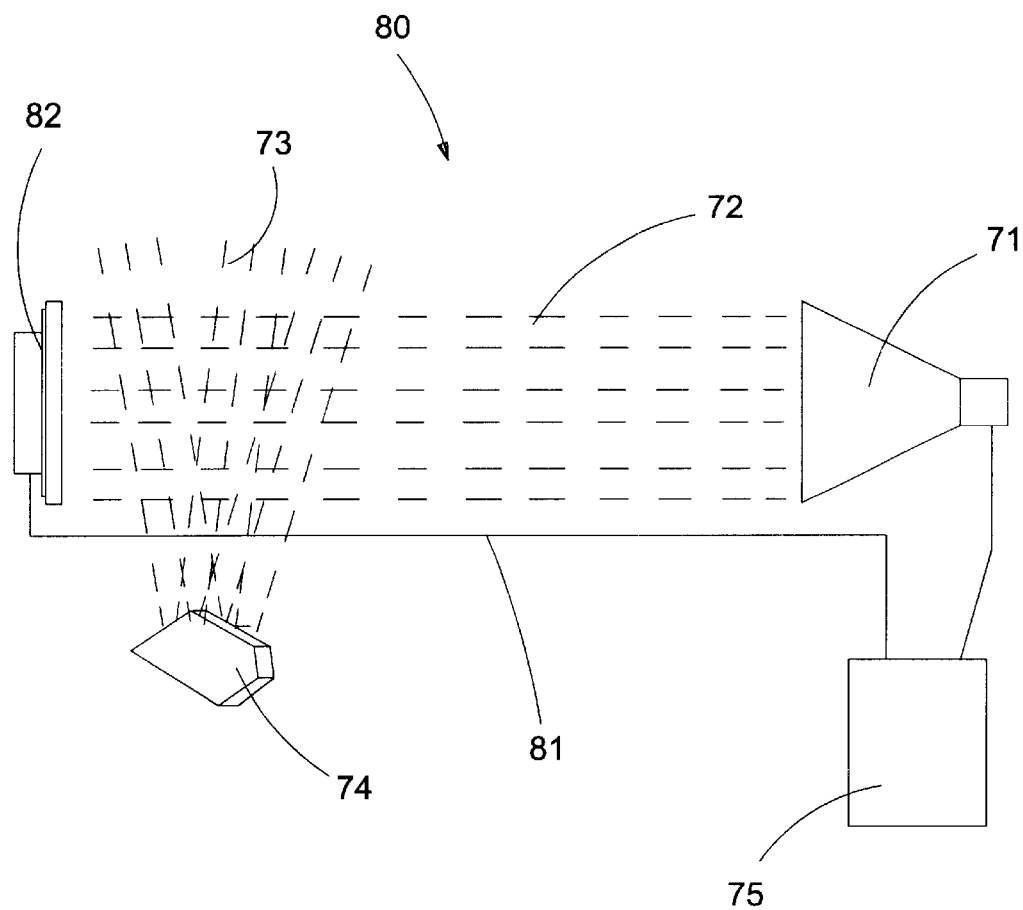
FIG. 6 is a schematic of an embodiment of the present invention that measures the amount of radio frequency radiation attenuated by ionization trails.

FIG. 6 shows an alternative embodiment of the present invention. Apparatus 80 comprises antenna 71 operatively arranged to emit radio frequency waves 72. Receiver 82 is operatively arranged to receive waves 72 that are transmitted through the air proximate object 74. Line 81 connects receiver 82 with unit 75, which comprises the rest of the apparatus. Thus, if object 74 comprises radioactive matter, ion tracks 73 will reflect some of waves 72. Receiver 82 will thus detect attenuation in the radio frequency wave emitted by transmitter 71. By measuring the level of attenuation, the presence of radioactive matter in object 74 can be determined. It should be readily apparent to one skilled in the art that these and other configurations may be used to determine the level of radio frequency radiation scattered or transmitted by a volume, and these modifications are intended to be within the spirit and scope of the invention as claimed.

Additionally, individual tracks may be detected if the radar energy is intense enough. This will occur if the electric field produced by the radar is strong enough to produce secondary ionization and thus amplify the ionization due to the radioactivity. Thus, the present invention determines the presence of radioactive material by detecting individual ion tracks, measuring the amount of radiation scattered by ion tracks, or measuring the amount of attenuation by ion tracks of a signal transmitted through a volume of air near an object. Based on the strength of the scattering return or attenuation, the present invention can also determine the strength of the radioactive material present.

It should be readily apparent to one skilled in the art that the above-described invention may be used as a stationary unit, in which case the frequency of the waves reflected or transmitted should be approximately the same as the transmitted wave. The present invention may also be used while being moved, in which case the reflected or transmitted wave received by the receiver may be doppler shifted from the transmitted wave. In this case, the apparatus is operatively arranged to account for any doppler shifts due to the movement of the transmitter and/or receiver. The present invention practiced with a moving or stationary transmitter, receiver, or transceiver is intended to be within the spirit and scope of the invention as claimed.

Thus, it is seen that the objects of the present invention are efficiently obtained, although modifications and changes to the invention should be readily apparent to those having ordinary skill in the art, and these modifications are intended to be within the spirit and scope of the invention as claimed.

What is claimed is:

1. An apparatus for the detection of radioactive material in an area comprising:
    a transmitter operatively arranged to transmit unpolarized radio frequency radiation;
    a receiver operatively arranged to measure an intensity of said radio frequency radiation; and,
    processing means operatively arranged to determine the presence of said radioactive material based on said intensity measurement.

2. The apparatus recited in claim 1 wherein said receiver measures intensity of said radio frequency radiation reflected by ion tracks in air proximate said area.

3. The apparatus recited in claim 1 wherein said receiver measures intensity of said radio frequency radiation transmitted by air proximate said area.

4. The apparatus recited in claim 1 wherein said radio frequency waves have a frequency in a range of 300 MHz to 30 GHz.

5. The apparatus recited in claim 1 wherein said radio frequency radiation is transmitted in pulses.

6. The apparatus recited in claim 5 wherein said pulses are transmitted at a pulse repetition rate in the range of 968 to 1000 pulses per second.

7. A method for the detection of radioactive material in an area comprising:
    transmitting unpolarized radio frequency radiation into air proximate said area;
    measuring an intensity of said radio frequency radiation; and, determining presence of said radioactive material based on said measured intensity.

8. The method recited in claim 7 wherein said intensity measurement comprises measuring intensity of said radio frequency radiation reflected by ion tracks in said air proximate said area.

9. The method recited in claim 7 wherein said intensity measurement comprises measuring intensity of said radio frequency radiation transmitted by said air proximate said area.

10. The method recited in claim 7 wherein said radio frequency waves have a frequency in a range of 300 MHz to 30 GHz.

11. The method recited in claim 7 wherein said radio frequency radiation is transmitted in pulses.

12. The method recited in claim 11 wherein said pulses are transmitted at a pulse repetition rate in the range of 968 to 1000 pulses per second.

13. An apparatus for the detection of radioactive material in an area comprising:
    a transmitter operatively arranged to transmit radio frequency radiation;
    a receiver operatively arranged to measure a power level of said radiation; and, processing means operatively arranged to determine the presence of said radioactive material based on a comparison of said measured power level of said received radiation from an area having no radioactive material with said measured power level of said received radiation from an area to be tested for radioactive material.

14. The apparatus recited in claim 13 wherein said receiver measures said power level of said radiation after said radiation is reflected by ion tracks in air proximate said area.

15. The apparatus recited in claim 13 wherein said receiver measures said power level of said radiation after said radiation is transmitted by air proximate said area.

16. The apparatus recited in claim 13 wherein said radio frequency waves have a frequency in a range of 300 MHz to 30 GHz.

17. The apparatus recited in claim 13 wherein said radiation is transmitted in pulses at a pulse repetition rate in the range of 968 to 1000 pulses per second.

18. A method for the detection of radioactive material in an area comprising:
    transmitting radio frequency radiation into air proximate said area;
    measuring a power level of said radiation; and,
    determining presence of said radioactive material based a comparison of a power level of received radiation from an area having no radioactive material with said measured power level of said received radiation from said area to be tested for radioactive material.

19. The method recited in claim 18 wherein said receiver measures said power level of said radiation after said radiation is reflected by ion tracks in air proximate said area.

20. The method recited in claim 18 wherein said receiver measures said power level of said radiation after said radiation is transmitted by air proximate said area.

21. The method recited in claim 18 wherein said radio frequency waves have a frequency in a range of 300 MHz to 30 GHz.

22. The method recited in claim 18 wherein said radiation is transmitted in pulses at a pulse repetition rate in the range of 968 to 1000 pulses per second.

* * * * *